July 4, 1950  J. D. LAWSON  2,513,498
WIRELESS AERIAL SYSTEM
Filed July 31, 1947
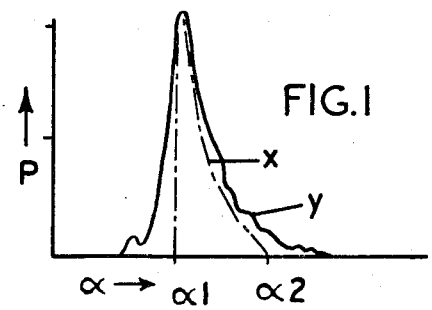
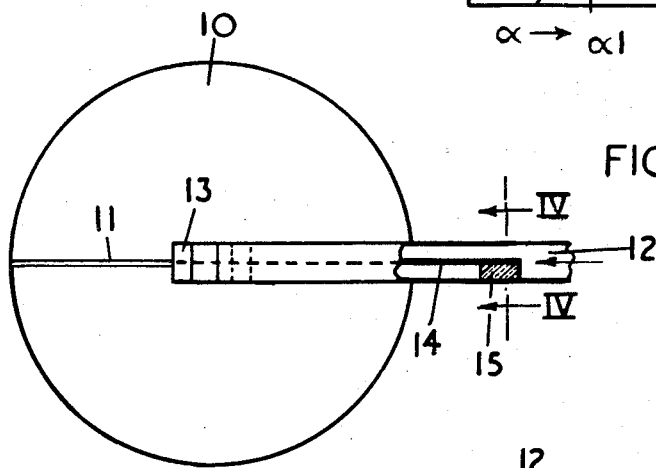
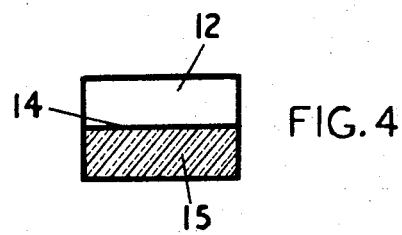
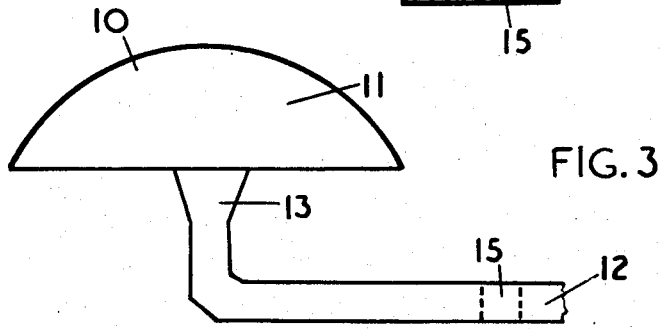
Inventor
J. D. Lawson
By
Attorney Patented July 4, 1950

2,513,498

UNITED STATES PATENT OFFICE 2,513,498

WIRELESS AERIAL SYSTEM

John David Lawson, Wolverhampton, England

Application July 31, 1947, Serial No. 765,100
In Great Britain October 11, 1945

Section 1, Public Law 690, August 8, 1946
Patent expires October 11, 1965

11 Claims. (Cl. 250—33.65)

This invention relates to wireless aerial systems and is more particularly concerned with arrangements for use at ultra-high frequencies and employing mirror or like reflecting surfaces whereby a radiation/reception characteristic or polar diagram of beam-like form may be provided.

The object of the invention is to provide an improved arrangement by which the polar diagram applicable to one chosen plane may be given a desired asymmetrical character, for instance a character of the kind described in copending United States application Serial No. 765,208, filed July 31, 1948, by Charles Holt Smith, Henry George Booker, and Philip Mayne Woodward.

According to the present invention a mirror surface, e. g., a part-paraboloidal surface, is divided by a conductive plate in a plane lying at right angles to that in which an asymmetrical polar characteristic is required and energy is supplied to or fed from each divided portion of said mirror surface from a common supply source or to a common receiving device through means which impose a phase displacement on the energy passing to or from one portion of the mirror with respect to that passing to or from the other portion of the mirror.

In a particular embodiment of the invention a part-paraboloidal mirror is divided into two similar halves by a diametrically disposed metal plate and energy is supplied to or fed from the opposite halves by means of a divided waveguide, one divided portion of which is filled for a chosen portion of its length with a dielectric material whereby the energy passing to or from the mirror half associated with such divided portion is phase-retarded with respect to the energy passing to or from the other mirror half through the other divided portion.

In order that the nature of the invention may be more readily understood one embodiment thereof will now be described by way of example with reference to the accompanying drawing in which:

Figure 1 is a graphical representation of the form of radiation/reception characteristic or polar diagram capable of being provided by the arrangement.

Figure 2 is a part-sectional front elevation; Figure 3 is a transverse section and Figure 4 is an enlarged detail sectional view taken on the line IV—IV of Figure 2.

The arrangement about to be described will be considered from the aspect of a transmitting aerial, i. e., with outward radiation therefrom but, as will be apparent to those skilled in the art, it may equally well be employed for reception purposes.

Referring to Figures 2, 3 and 4 the aerial arrangement comprises a part-paraboloidal mirror 10 divided diametrically by a metal plate 11 into two similar halves. Energy is fed to the mirror by a waveguide 12 having a flared orifice or horn 13 whose aperture is located substantially coincident with the focus of the mirror 10.

The waveguide 12, including its horn 13, is divided for a portion of its length from the aperture of the horn by a division plate 14 which lies in the same plane as the plate 11 and whereby the energy supplied by the guide 12 is divided equally between the two halves of the mirror, the energy passing to one mirror half by way of one divided portion of the guide and the energy passing to the other mirror half by way of the other divided portion of the guide. The guide 12 is arranged to carry a wave of the H mode with the electric vector thereof disposed transversely to the division plate 14.

One of the divided portions of the guide 12 is filled for a predetermined portion of its length by a block 15 of suitable dielectric material, such as a low loss plastic of the polystyrene group. The presence of this block of a dielectric material imposes a phase-retardation upon the energy passing to the mirror half through the particular waveguide portion which contains it with respect to the energy passing to the other mirror half through the other unfilled waveguide portion. The degree of phase-retardation effected is governed by the dielectric constant of the material employed and the length of the guide portion filled thereby, the greater the dielectric constant and the greater the length, the greater the phase-delay imposed. In practice a low loss plastic of the polystyrene group has been found suitable.

By suitable choice of the degree of phase-retardation, the resulting polar diagram of the mirror arrangement may be made to have an asymmetrical character as shown in Figure 1 which shows graphically the relative power intensity values P for different radiation angles $\alpha$. The full line curve $y$ is illustrative of one constructional form of the device from which it will be seen that power intensity is at a maximum at one angle $\alpha 1$; but instead of decreasing symmetrically on either side of such an angle, decreases rapidly on one side and more slowly on the other.

Such an arrangement is desirable in certain circumstances, e. g., as described in copending United States application Serial No. 765,208, filed on July 31, 1947, by Charles Holt Smith, Henry G. Booker, and Philip Mayne Woodward and entitled: "Aerial Systems." The dotted line curve $x$ illustrates the ideal polar diagram according to the aforesaid copending application in which radiation over an angle $a1-a2$ varies in accordance with the square of the cosecant value of any angle within said angle $a1-a2$.

In a modification, the body of the dielectric material, by which phase-retardation of the energy proceeding to or from one portion of the mirror is effected, may be arranged so that it can be wholly or partly removed, if desired, so that the form of the polar diagram applicable to the aerial system can be altered at will.

Such an arrangement is convenient for use in an aircraft, for instance, when it is desired to use a common aerial system in connection with radar equipment adapted to provide, (a) a navigational survey of the terrain beneath the aircraft and (b) a search within the region around the aircraft at or about the same horizontal plane to detect other aircraft, radar beacons and so forth. In such use the aerial system would be arranged so as to provide the requisite narrow beam like polar diagram to achieve purpose (b) above when the dielectric body is removed and to have such polar diagram suitably modified to one of the forms referred to in the above mentioned copending application for achieving purpose (a) when the dielectric body is inserted into the guide. Any suitable mechanically or electrically operated mechanism may be used for effecting movement of the dielectric body.

I claim:

1. An ultra-high frequency antenna system which has an asymmetrical radiation characteristic in a chosen plane and comprising a part-paraboloidal reflector, a diametrically disposed conducting plate dividing the reflector into two similar parts and lying at right-angles to said chosen plane, a waveguide having an output end feeding into said reflector, a conducting plate extending coplanar with said first-named conducting plate for a substantial distance which distance begins at said output end and extends into the waveguide, said second-named plate dividing said waveguide into a first divided portion feeding into one part of said reflector and a second divided portion feeding into the other part of said reflector, and a block of dielectric material of the same cross-section as said first portion and interposed in and filling said first portion for a part of the length thereof.

2. An ultra-high frequency antenna system according to claim 1 and in which said block of dielectric material is so constructed and arranged in said waveguide as to be removable therefrom.

3. An ultra-high frequency antenna system which has an asymmetrical radiation characteristic in a chosen plane and comprising a part-paraboloidal reflector, a diametrically disposed conducting plate dividing the reflector in two similar parts and lying at right-angles to said chosen plane, a waveguide having an output end feeding into said reflector, a conducting plate extending coplanar with said first-named conducting plate for a substantial distance which distance begins at said output end and extends into the waveguide, said second-named plate dividing said waveguide into a first divided portion feeding into one part of said reflector and a second divided portion feeding into the other part of said reflector, and dielectric material filling a portion of the length of the first divided portion, said first divided portion including means to permit said dielectric material to be partly removable therefrom whereby the radiation pattern of the antenna system may be varied.

4. An ultra-high frequency antenna system comprising a bowl-shaped reflector, a conducting plate dividing the reflector into two portions, and a divided waveguide having its output end feeding into the bowl-shaped reflector, said divided waveguide having a conducting plate separating the same longitudinally into two portions and including means for delaying the energy in one of the portions more than that in the other portion, said conducting plates being coplanar.

5. An ultra-high frequency antenna system which has an asymmetrical radiation in a chosen plane comprising a bowl-shaped reflector, a diametrically disposed conducting plate dividing the reflector into two similar portions, said plate being disposed at right angles to said chosen plane, a waveguide having an output end feeding into said reflector, a conducting plate extending coplanar with said first-named conducting plate for a substantial distance which distance begins at said output end and extends into the waveguide, said second-named plate dividing said waveguide into a first divided portion feeding into one part of said reflector and a second divided portion feeding into the other part of said reflector, and means included in the first of said portions for delaying the energy through that portion.

6. The system of claim 5 in which the last-named means constitutes dielectric means.

7. The system of claim 6 in which said dielectric means completely fills said first portion for a limited distance.

8. The system of claim 7 in which said dielectric means is partly removable.

9. An ultra-high frequency antenna which has an asymmetrical radiation characteristic in a chosen plane comprising a bowl-shaped reflector the inner surface of which conforms to the shape of a limited portion of a paraboloid of revolution with the axis of revolution of the bowl colinear with that of said paraboloid of revolution, said inner surface being symmetrical about said axis, a flat conducting plate dividing said bowl into two equal reflecting surfaces and intersecting said inner surface at all points thereof which are intersected by the plane that includes said plate, and waveguide means operable from a single source to feed energies displaced in phase with respect to each other to said reflecting surfaces respectively and having an open output end facing said reflecting surfaces, the waveguide means being symmetrical about said axis of revolution for a substantial distance adjacent said output end, said waveguide means including a conducting plate dividing the waveguide means into two waveguide portions, said waveguide means including dielectric means in one of said portions of a higher dielectric constant than the dielectric in the other of said portions, said last-named conducting plate being coplanar with the first-named conducting plate and extending into the waveguide means for a substantial distance beginning at the output end thereof.

10. The radiator of claim 9 in which the waveguide means includes means for permitting a limited portion of the dielectric means to be removed therefrom with the remaining portion of the dielectric means retained therein.

11. An ultra-high frequency radiator which has an asymmetrical radiation characteristic in a chosen plane comprising a bowl-shaped reflector the inner surface of which conforms to the shape of a limited portion of a paraboloid of revolution with the axis of revolution of the bowl colinear with that of said paraboloid of revolution, a flat conducting plate dividing said bowl into two equal reflecting surfaces and intersecting the reflector at all points thereof which are intersected by the plane that includes said plate, and wave guide means operable from a single source to feed energies displaced in phase with respect to each other to said reflecting surfaces and having an open output end facing said reflecting surfaces, the waveguide means being symmetrical about said axis of revolution for a substantial distance adjacent said output end and having the entire section thereof which is in front of the reflecting surfaces symmetrical about the plane of said conducting plate, said waveguide means including a conducting plate coplanar with the first-named plate and dividing the waveguide into two equal waveguide portions, said waveguide means also including dielectric means in one of said waveguide portions for reducing the speed of the waves in such portion to a lower transit speed than obtains in the other portion.

JOHN D. LAWSON.

REFERENCES CITED

The following references are of record in the file of this patent:

UNITED STATES PATENTS

| Number | Name | Date |
|---|---|---|
| 2,155,821 | Goldsmith | Aug. 25, 1939 |
| 2,275,646 | Peterson | Mar. 10, 1942 |
| 2,411,872 | Feldman et al. | Dec. 3, 1946 |
| 2,422,184 | Cutler | June 17, 1947 |
| 2,437,281 | Tawney | Mar. 9, 1948 |
| 2,454,530 | Tiley | Nov. 23, 1948 |
| 2,455,403 | Brown | Dec. 7, 1948 |

FOREIGN PATENTS

| Number | Country | Date |
|---|---|---|
| 231,920 | Switzerland | July 17, 1944 |